United States Patent
Moon

(10) Patent No.: US 10,325,420 B1
(45) Date of Patent: Jun. 18, 2019

(54) VIN SCAN RECALL NOTIFICATION

(71) Applicant: United Services Automobile Association (USAA), San Antonio, TX (US)

(72) Inventor: Dexter Moon, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 15/454,895

(22) Filed: Mar. 9, 2017

Related U.S. Application Data

(60) Provisional application No. 62/306,506, filed on Mar. 10, 2016.

(51) Int. Cl.
| | | |
|---|---|---|
| G06Q 10/00 | (2012.01) | |
| G07C 5/00 | (2006.01) | |
| G06Q 10/10 | (2012.01) | |
| H04W 4/02 | (2018.01) | |
| G05D 1/00 | (2006.01) | |
| G06F 17/24 | (2006.01) | |
| G07C 5/08 | (2006.01) | |
| G01M 17/00 | (2006.01) | |

(52) U.S. Cl.
CPC ......... *G07C 5/006* (2013.01); *G06Q 10/1095* (2013.01); *G07C 5/008* (2013.01); *H04W 4/02* (2013.01); *G01M 17/00* (2013.01); *G05D 1/0044* (2013.01); *G05D 1/0088* (2013.01); *G06F 17/24* (2013.01); *G07C 5/08* (2013.01)

(58) Field of Classification Search
CPC .......... G01M 17/00; G07C 5/08; G06F 17/30; G06F 17/24; G06Q 30/06
USPC ....................................... 701/29.6
See application file for complete search history.

(56) References Cited

U.S. PATENT DOCUMENTS

| | | | | |
|---|---|---|---|---|
| 9,613,467 B2* | 4/2017 | Roberts | ................. | G07C 5/008 |
| 9,613,469 B2* | 4/2017 | Fish | ................... | G06F 3/04886 |
| 9,824,453 B1* | 11/2017 | Collins | ............... | G06F 16/5838 |
| 2016/0034590 A1* | 2/2016 | Endras | ................ | G06F 16/9535 707/770 |
| 2016/0335816 A1* | 11/2016 | Thoppae | .............. | G07C 5/0808 |
| 2017/0146602 A1* | 5/2017 | Samp | ..................... | G01R 31/34 |
| 2017/0337610 A1* | 11/2017 | Beguesse | ........... | G06Q 30/0623 |

* cited by examiner

*Primary Examiner* — Thomas G Black
*Assistant Examiner* — Wae L Louie
(74) *Attorney, Agent, or Firm* — Brinks Gilson & Lione

(57) ABSTRACT

A system and method are disclosed for helping a user determine whether a vehicle is subject to a safety recall and assisting the user with addressing incomplete safety recalls. A vehicle identification number (VIN) may be extracted from an image of a vehicle captured by a user electronic device and used to request safety recall information from a remote information system, which may provide a list of recalls associated with the vehicle. A list of nearby service centers may be identified based on the physical location of the user electronic device, and service appointments to address any incomplete recalls may be scheduled, either automatically or in response to user input.

20 Claims, 3 Drawing Sheets

VIN SCAN RECALL NOTIFICATION

BACKGROUND

1. Field of Invention

This disclosure relates to the automated identification of safety recalls associated with a vehicle, based on a vehicle identification number (VIN) associated with the vehicle, for use in a variety of contexts.

2. Background Information

Many people operate vehicles, such as automobiles, each day, and it is important that such vehicles are operated safely. The National Highway Traffic Safety Administration (NHTSA) is responsible for getting unsafe vehicles off the road, and mandates that manufacturers recall vehicles that do not meet federal safety standards or vehicles that have known safety defects. The NHTSA may initiate recall campaigns on vehicle components that it determines are non-compliant or unsafe. The vehicles covered by a particular campaign may be identified by particular vehicle information (e.g., make, model and model year), which may be obtained from a unique Vehicle Identification Number (VIN) located within the vehicle (e.g., on the driver side dashboard or underneath the front windshield of the vehicle or driver side door jamb data plate). Once a vehicle has been recalled, the faulty component must be repaired at an authorized service center (e.g., a car dealership). Until it is repaired the vehicle operator could be driving around with a defective and possibly dangerous component, which could fail and cause an accident.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Given the risk of an accident, it is important to ensure that safety defects and recalls are addressed as soon as possible. But in many instances, a vehicle operator may be unaware that their vehicle is subject to a safety recall. For instance, recall notices are sent to the owners of record, but sometimes that information may be incorrect. It may also be the case that the owner of record is not the party who regularly operates the vehicle. Sometimes, consumers simply ignore the notice, mistaking it for an advertisement. The resale market further complicates the issue, as consumers may sell a vehicle without having responded to the recall notice, leaving the buyer of the vehicle completely unaware. The recall identification system described below may assist a user in determining if a vehicle is subject to a safety recall and may assist the user in getting the vehicle repaired if the safety recall has not yet been completed. The recall identification system may also be used to assist a user when purchasing a vehicle by allowing the user to determine if the vehicle is subject to a safety recall and providing the user with additional information to assist in making a purchasing decision. The recall identification system may also provide information to insurance companies, which may be used by the insurance company, for example, to adjust a user's insurance rate and/or premium.

Figure 1:
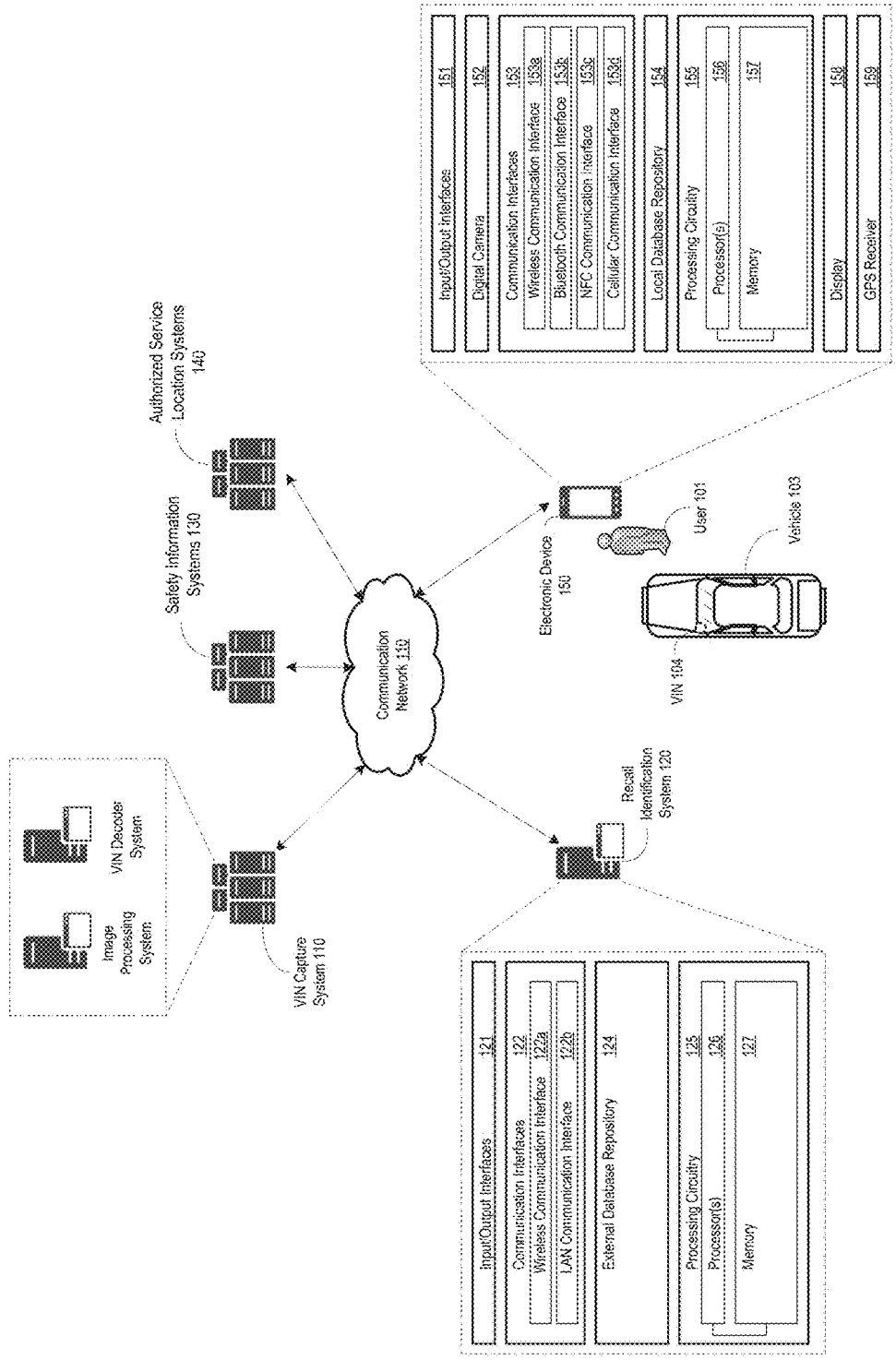
FIG. 1 illustrates a high level view of the environment in which the recall identification system operates.

FIG. 1 illustrates a high-level view of the environment in which the recall identification system may operate. The system environment 100 may include one or more users 101, having user electronic devices 150, a VIN capture system 110, a recall identification system 120, one or more safety information systems 130 and one or more authorized service center systems 140. The user electronic devices 150, VIN capture system 110, recall identification system 120, safety information systems 130, and authorized service center systems 140 may be communicatively linked via the communication network 160. The communication network 160 may include intermediate network devices or logic operating according to any communication mediums, protocols, topologies, standards, including as examples, Ethernet, cable, DSL, Multimedia over Coax Alliance, power line, Ethernet Passive Optical Network (EPON), Gigabit Passive Optical Network (GPON), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig, and others.

The VIN capture system 110 may be capable of processing digital images to extract a VIN contained within the image and determining vehicle information associated with the VIN, and may itself include an image processing system and a VIN decoder system. The VIN capture system described herein may utilize aspects and features described in U.S. Pat. No. 9,036,040, filed Dec. 20, 2012, entitled VEHICLE IDENTIFICATION NUMBER CAPTURE, which is commonly assigned and incorporated herein by reference in its entirety. The VIN capture system 110 may be accessed over the communications network 160, for example, via a web service or web API (e.g., a SOAP or REST service). While the VIN capture system 110 is illustrated as an independent system, some or all of the features and functionality of the VIN capture system 110 may be integrated within the recall identification system 120 or as part of the user electronic device 150 itself, for example, as part of the safety recall advisory tool described below.

The safety information systems 130 may include public or private web servers (e.g., database servers maintained by the National Highway Traffic Safety Administration (NHTSA)) which provide information regarding safety recall campaigns. The safety information systems 130 may be accessed over the communications network 160, for example, via a web service or web application program interface (API) (e.g., a SOAP or REST service) that may be made available over the communications network 160. As detailed in the embodiments described below, the recall identification system 120 and/or user electronic device 150 may communicate with the safety information systems 130 to obtain information regarding different safety recall campaigns. The recall identification system 120 or user electronic device 150, for example, in order to obtain safety recall information associated with a particular vehicle may be able to submit a query to the safety information systems 130 requesting this information, where the query may include a VIN for the particular vehicle, or other vehicle identification information. The safety information systems 130 may respond to such queries by providing the recall identification system 120 or user electronic device 150 with a list of safety recall campaigns that are associated with the particular vehicle along with descriptive information for each safety recall campaign in the list. The safety information systems 130 may also include a completion status indicator in responding to the query, which indicates whether each of the safety recalls are complete or incomplete.

The authorized service center systems 140 may include public or private web servers that facilitate interaction with an authorized service center (e.g., a car dealership), for example, allowing users to schedule a vehicle service appointment at the authorized service center or providing information regarding the authorized service center (e.g., hours of operation or vehicle manufacturers that they service). The authorized service center systems 140 may be accessed over the communications network 160, for example, via a web service or web API (e.g., a SOAP or REST service) that may be made available over the communications network 160. The web service or web API offered by the authorized service center systems 140, in many instances, may be publicly available and freely accessible by any system or device. In some circumstances, the authorized service center systems 140 may choose to limit access to certain systems, for example, the systems of a partnering organization (e.g., a partnering insurance company), which may provide authentication information when accessing the authorized service center systems 140. As detailed in the embodiments described below, the recall identification system 120 and/or user electronic device 150 may communicate with the authorized service center systems 140 to schedule service appointments. The recall identification system 120 or user electronic device 150, for example, may be able to submit a service appointment availability request for a particular vehicle to the authorized service center systems 140. The request may include a VIN for the particular vehicle or other vehicle identification information along with any necessary details regarding the safety recall campaign and the type of servicing that will be performed. The authorized service center systems 140 may respond to such queries by providing the recall identification system 120 or user electronic device 150 with a list of available service appointments and details regarding each of the service appointment (e.g., a service appointment ID, a service appointment duration, an anticipated completion time, etc.). The recall identification system 120 or user electronic device 150, in turn, may submit a reservation request to the authorized service center systems 140 in order to schedule a particular service appointment. The authorized service center systems 140 may send a scheduling confirmation message to the recall identification system 120 or user electronic device 150 once the service appointment is scheduled.

The recall identification system 120 may include one or more input/output interfaces 121, one or more communication interfaces 122 (e.g., a wireless communication interface 122*a* and a LAN communication interface 122*b*), an external database repository 124, and processing circuitry 125, which may include one or more processors 126 in communication with memory 127. The recall identification system 120 may be accessed over the communications network 160, for example, via a web service or web application program interface (API) (e.g., a SOAP or REST service) that may be made available over the communications network 160, and may utilize the communication interfaces 122 in doing so. The user electronic device 150, for example, may submit certain information requests or be able to initiate certain actions on the recall identification system 120. The web service or web API offered by the recall identification system 120, in many instances, may be freely accessible by any system or device. In other instances, however, the recall identification system 120 may choose to limit access to certain systems or devices (e.g., user electronic devices 150 of authorized customers), which may provide authentication information when accessing the recall identification system 120. The recall identification system 120 may also interact with the safety information systems 130 and authorized service center system 140, and may similarly utilize the communication interfaces 122 in doing so.

The external database repository 124 may include one or more databases. The external database repository 145, for instance, may include a database containing information regarding authorized service centers. The database, for example, may include general information regarding the authorized service center (e.g., its physical location or vehicle manufacturers that it can service) and identify an associated authorized service center system 140 with which to interact (e.g., for scheduling service appointments) along with the features and functionality that the authorized service center systems 140 may support. The external database repository 124 may also include databases containing information associated with a particular user 101, for example, a database containing insurance records for a user 101. These insurance records may include, for example and without limitation, vehicle insurance application forms and substantiating documentation (e.g., copies of the vehicle title and registration), vehicle insurance policy information, and/or previously submitted vehicle insurance claims. In some instances, the databases within the external database repository 145 may be maintained and updated by the operator of the recall identification system 120 (e.g., an insurance company), but in others, the databases may be maintained or updated by third parties (e.g., the authorized service centers may update associated information in the databases themselves). While the recall identification system 120 is illustrated as an independent system, some or all of the features and functionality of the recall identification system 120 may be integrated within the user electronic device 150 itself, for example, as part of the safety recall advisory tool described below.

The user electronic device 150 may include one or more input/output interfaces 151, a digital camera 152 or other video capture device, one or more communication interfaces 153 (e.g., a wireless communication interface 153*a*, a Bluetooth communication interface 153*b*, a NFC communication interface 153*c*, or a cellular communication interface 153*d*), a local database repository 154, a display 158, a GPS sensor 159, and processing circuitry 155, which may include one or more processors 156 in communication with memory 157. The user electronic device 150 may be able to communicate with the VIN capture system 110, recall identification system 120, safety information systems 130 and authorized service center systems 140 over communications network 160, and may utilize the communication interfaces 153 in doing so. As illustrated in FIG. 1, the user electronic device 150 may be a mobile communication device, e.g., a cellular telephone with a digital camera. However, the user electronic device 150 may take any number of additional forms, including for example and without limitation, a laptop, digital camera, personal digital assistant (PDA), tablet device, portable music player, or the like.

In operation, the user electronic device 150 may communicate with the VIN capture system 110, recall identification system 120, safety information systems 130, and authorized service center systems 140 to provide a user 101 with the ability to determine, in real-time, whether one or more safety recalls have issued for a vehicle 103, provide the user 101 with details regarding the safety recalls, and assist the user 101 in getting the vehicle 103 repaired if necessary. In doing so, the user electronic device 150 may utilize a safety recall advisory tool, which may be accessed in the form of a software application that may be installed on the device, a web application accessible via a web browser, or in some other manner.

The user 101 may use the safety recall advisory tool to identify a vehicle of interest (e.g., the user's car) for which safety recall information is desired. The user 101 may identify a vehicle by its VIN, as the VIN may contain the vehicle information necessary to identify any safety recall campaigns that may be associated with the vehicle. The safety recall advisory tool may assist the user 101 in determining the VIN associated with the vehicle. In some embodiments, the user 101 may use the safety recall advisory tool to capture an image of the vehicle 103 containing a VIN 104 using the digital camera 152 of the user electronic device 150, which the safety recall advisory tool may transmit to the VIN capture system 110 for processing and decoding. The safety recall advisory tool may also allow the user to select an image previously captured and stored on the user electronic device 150 for transmission to the VIN capture system 110 for processing and decoding. The VIN capture system 110 may process the captured image and extract the VIN present in the image and decode the VIN to determine vehicle information associated with the VIN. The VIN capture system 110 may transmit the extracted VIN and/or associated vehicle information back to the user electronic device 150. The safety recall advisory tool may present the extracted VIN and associated vehicle information for user confirmation. As noted above, in some embodiments, the VIN capture system 110 may be provided as part of the recall identification system 120 or as part of the user electronic device 150 itself. In the case of the former, the user electronic device 150 may transfer the captured image to the recall identification system 120 for processing and decoding, and may receive the extracted VIN and/or associated vehicle information from the recall identification system 120 in return. In the case of the latter, the user electronic device 150 may be able to extract the VIN present in the image and/or decode the VIN to determine vehicle information associated with the VIN. Such functionality may be provided as part of the safety recall advisory tool (e.g., as a plug-in or module) or as a separate application.

In some embodiments, the safety recall advisory tool may allow the user 101 to select the vehicle from a list of vehicles associated with the user 101, where each vehicle on the list may be identified by its VIN. The safety recall advisory tool may store a list of vehicles associated with the user 101 in the local database repository 154. The safety recall advisory tool may additionally, or in the alternative, request a list of vehicles associated with the user 101 from the recall identification system 120. In response to the information request, the recall identification system may generate a list of associated vehicles by examining information associated with the user 101, for example, information in the insurance records database stored in the external database repository 124. The VIN for a vehicle, for example, may appear on the title or registration for the vehicle, an insurance policy for the vehicle, or on past vehicle service records submitted with a vehicle insurance claim, all of which may be stored in the external database repository 124.

Once the vehicle of interest is identified, the safety recall advisory tool may request information regarding safety recalls associated with the vehicle 103 from the recall identification system 120. The information request may include the determined VIN and/or associated vehicle information. The safety recall advisory tool may request this information automatically upon identification of the vehicle of interest (e.g., once the VIN has been extracted from a vehicle image) or in response to a user input provided through the user electronic device 150. A user, for example, may click, tap, or otherwise select an information request button presented to the user via a user interface of the safety recall advisory tool.

The recall identification system 120, in response to receiving the request, may generate a safety recall query using the VIN and/or associated vehicle information provided in the request, and may submit the query to a safety information system 130. The safety information system 130 may respond to the query by providing a list of safety recall campaigns that have been issued for the vehicle within a particular time frame (e.g., the past 15 years) along with descriptive information regarding the safety recall. The descriptive information, for example, may identify a recall campaign number and a list of effected components, and may provide a descriptive summary for the safety recall, a description of the safety consequences associated with the recall, and a description of how the safety issue will be addressed. As an example, the recall identification system 120 may receive the following information for a particular recall:

<Recall>
  <ModelYear>2012</ModelYear>
  <Make>BMW</Make>
  <Model>3-SERIES</Model>
  <Manufacturer>BMW OF NORTH AMERICA, LLC</Manufacturer>
  <NHTSACampaignNumber>12V176000</NHTSACampaignNumber>
  <Component>SEATS:FRONT ASSEMBLY:HEAD RESTRAINT</Component>
  <Summary>
  BMW IS RECALLING CERTAIN MODEL YEAR 2012 BMW 3-SERIES VEHICLES MANUFACTURED FROM OCTOBER 19, 2011, THROUGH MARCH 18, 2012, THAT HAVE FRONT SEAT HEAD RESTRAINTS THAT EXCEED THE DOWNWARD MOVEMENT LIMIT OF 25 MM IN THE HIGHEST POSITION. THUS, THESE VEHICLES FAIL TO COMPLY WITH THE REQUIREMENTS OF FEDERAL MOTOR VEHICLE SAFETY STANDARD NO. 202A, "HEAD RESTRAINTS."
  </Summary>
  <Conequence>
  IN THE EVENT OF A VEHICLE CRASH, THE HEAD RESTRAINT MAY UNEXPECTEDLY MOVE DOWN SLIGHTLY IF IT WAS ADJUSTED TO THE FULLY EXTENDED POSITION, INCREASING THE RISK OF PERSONAL INJURY.
  </Conequence>
  <Remedy>
  BMW WILL NOTIFY OWNERS, AND DEALERS WILL ATTACH A CLAMP TO THE FRONT SEAT HEAD RESTRAINT POSTS, FREE OF CHARGE. THE SAFETY RECALL BEGAN ON MAY 30, 2012. OWNERS MAY CONTACT BMW CUSTOMER RELATIONS AND SERVICES AT 1-800-525-7417.
  </Remedy>
</Recall>

The response provided by the safety information systems 130 may also provide an indication regarding whether the safety recalls have been completed (i.e., have been repaired) or whether they remain incomplete (i.e., have yet to be repaired). The recall identification system 120 may process the response provided by safety information systems 130 to generate a recall history report, and send the report to the user electronic device 150. The safety recall advisory tool may display, or otherwise present, the report to the user 101. In some embodiments, the safety recall advisory tool may be able to interface directly with the safety information systems 130, and the user electronic device 150 may generate and submit the safety recall query itself. The safety recall advisory tool may then process the responses provided by the safety information systems 130 to generate a recall history report and present the report to the user. The recall history report may provide the user with the listing of the different safety recall campaigns that have been issued for the vehicle along with descriptive information regarding the safety recall campaigns.

The safety recall advisory tool may also allow the user 101 to take action to address any safety recalls that have not yet been completed. The safety recall advisory tool, for example, may identify authorized service centers where the user 101 may be able to have the vehicle components at issue repaired, and may allow the user 101 to schedule a service appointment at a particular authorized service center. For instance, the safety recall advisory tool when presenting the recall history report may generate a link or button for each incomplete safety recall that the user 101 may select through the user interface to identify authorized service centers where the user 101 may have the vehicle components repaired or replaced.

In doing so, the safety recall advisory tool may determine the location of the user electronic device 150 (i.e., the user's location) and compare the determined location against known locations of authorized service centers to identify authorized service centers within a defined range (e.g., within 5 miles of the user's location). The safety recall advisory tool may determine the location of the user electronic device 150 using a variety of techniques, and may rely on features of the user electronic device 150 to do so. The user electronic device 150, for example, may include a GPS receiver 159, which the safety recall advisory tool can use to determine the device's location. The safety recall advisory tool may also be able to determine the location of the user electronic device 150 based on the Wi-Fi network or cellular network to which it may be connected (e.g., using cell identification or triangulation techniques).

In some embodiments, the recall identification system 120 may assist in identifying authorized service centers that may be near the user. For example, the safety recall advisory tool may transmit the location of the user electronic device 150 to the recall identification system 120, which may compare the provided location against known locations of authorized service centers that may be stored in external database repository 124 to identify authorized service centers falling within a defined range (e.g., within 5 miles of the user's location). In other embodiments, the safety recall advisory tool may request a list of authorized service centers from the recall identification system 120 and perform the location comparison itself. The safety recall advisory tool may also allow the user 101 to filter or limit the list of nearby authorized service centers to a particular subset of authorized service centers, for example, those which the user 101 may have previously visited. The recall identification system 120 may also assist in this process, for example, by providing the safety recall advisory tool with a list of service locations that the user has previously visited, which the recall identification system 120 may identify by examining vehicle insurance claims associated with the user 101 in the insurance records database in the external database repository 124.

The safety recall advisory tool may present the user 101 with a list of identified authorized service centers, and allow the user 101 to select a particular service center where they would like to schedule an appointment. Based on a user selection, the safety recall advisory tool may determine an authorized service center system 140 associated with the particular service center, and submit a service appointment availability request to the authorized service center system 140. The authorized service center system 140 may provide a list of available service appointments in response. The safety recall advisory tool may present the user 101 with the list of available service appointments, and may generate a scheduling link or button for each available service appointment, which the user 101 may select to schedule a particular service appointment using the authorized service center system 140. The safety recall advisory tool may present the user 101 with an appointment scheduling confirmation.

In some embodiments, the safety recall advisory tool may automatically identify one or more service centers (e.g., those within a defined range of the user) that are able to repair the vehicle, and submit service appointment availability requests to associated service center systems 140. The safety recall advisory tool may receive scheduling information in response to the service appointment availability requests, and may present the user 101 with a list of available service appointments along with corresponding links or buttons, which the user 101 may select to schedule a particular service appointment. In other embodiments, the safety recall advisory tool may automatically reserve or schedule a service appointment for the user 101, which the user 101 may then choose to opt-out of or cancel. In such cases, the safety recall advisory tool may automatically identify one or more service centers (e.g., those within a defined range of the user) that are able to repair the vehicle, and submit service appointment availability requests to associated service center systems 140. The safety recall advisory tool may receive scheduling information in response to the service appointment availability requests, and may automatically select a particular service appointment that may be desired. The safety recall advisory tool, for example, may select the earliest or most convenient service appointment, which may be determined by comparing the available service appointments against the current time or the user's calendar, respectively. The safety recall advisory tool may go ahead and automatically schedule the particular service appointment with the particular authorized service center using the associated service center system 140.

As noted above, in some embodiments, access to the associated service center systems 140 may be limited to certain systems and devices. For example, the recall identification system 120 may be authorized to access the associated service center systems 140 while the user electronic device 150 may not. In such situations, the recall identification system 120 may act as an intermediary between the user electronic device 150 and the associated service center systems 140, passing requests from the safety recall advisory tool to the associated service center systems 140 and forwarding responses from the associated service center systems 140 back to the safety recall advisory tool.

In another mode of operation, in the context of purchasing a vehicle (e.g., at a used car lot or a military resale lot), the safety recall advisory tool may allow a user to determine if a vehicle is subject to a safety recall and provide the user with additional information to assist in making a purchasing decision. Similar to the method(s) of operation described above, the user 101 may use the safety recall advisory tool to identify a vehicle of interest for which safety recall information is desired, for example, a car that the user 101 is interested in test driving or purchasing. The user 101 may use the safety recall advisory tool to capture an image of the vehicle 103 containing a VIN 104 using the digital camera 152 of the user electronic device 150, which the safety recall advisory tool may process and decode itself or transmit to the VIN capture system 110 or recall identification system 120 for processing and decoding. Once the appropriate vehicle identification information (i.e., the VIN) has been obtained, the safety recall advisory tool may, automatically or in response to a user input, request information regarding safety recalls associated with the vehicle 103 by submitting a request to the recall identification system 120 or by generating and submitting a query directly to the safety information system 130. The safety information system 130 may respond to the query by providing a list of safety recall campaigns that have been issued for the vehicle within a particular time frame (e.g., the past 15 years) along with descriptive information regarding the safety recall, including whether the safety recall has been addressed for the particular vehicle of interest. The response provided by the safety information systems 130 may be processed by the safety recall advisory tool (or recall identification system 120) to generate a recall history report that may displayed, or otherwise presented, to the user 101. In this way, the user 101 is able to determine the safety recall history of a vehicle they are interested in purchasing in real time, which may help to inform the user's decision of whether to purchase the vehicle or not.

The safety recall advisory tool may further assist in this decision making process by presenting the user 101 with additional information, for example, insurance premium information or vehicle financing information, which may be affected by whether a safety recall for the vehicle has or has not been completed. The safety recall advisory tool may submit a request for this information to the recall identification system 120, which may be able to determine insurance premiums or financing options for the user 101 or may have such information stored in the external database repository 120. The request may include the recall history report and/or vehicle identification information (i.e., the determined VIN) along with details regarding the user (e.g., an insurance account number associated with the user, or user provided demographic information), which the recall identification system 120 may use to determine the user's insurance premium or financing options. The recall identification system 120 may respond to the request by providing a list of insurance premium or financing options that are available to the user, along with an indication of whether and how the premium or financing rates are affected by the vehicles safety recall status. For example, the recall identification system 120 may indicate that the user's insurance premium would be $300 if they purchased the vehicle as is or would be $250 if certain incomplete safety recalls were addressed. The safety recall advisory tool may present this information to the user to better inform their purchasing decision.

Figure 2:
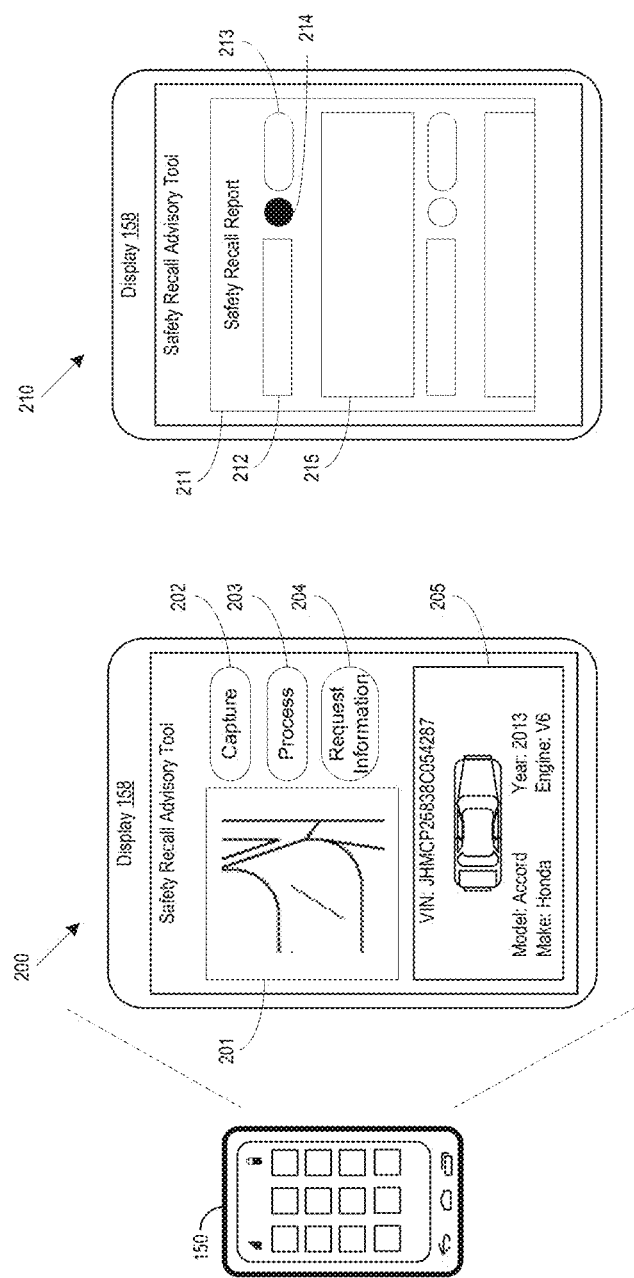
FIG. 2 illustrates an example of the interface provided on the user electronic device.

FIG. 2 illustrates an example of some of the user interfaces that the safety recall advisory tool may provide on the display 158 of the user electronic device 150. In a first view 200, the safety recall advisory tool may present an interface that includes an image window 201 where a preview of the image that will be captured by the digital camera 152 may be initially displayed. The safety recall advisory tool may also provide one or more user selectable buttons, including a capture button 202, a process button 203, and a request security recall information button 204. The capture button 202 may be selected by the user 101 to capture a digital image using the digital camera 152, and once selected the safety recall advisory tool may provide a thumbnail of the image that was captured in the image window 201. The process button 203 may be selected by the user 101 to initiate the transmission of the captured image to the VIN capture system 110 for processing and decoding. Where the functionality of the VIN capture system 110 is provided within the user electronic device 150, the process button 203 may initiate processing and decoding of the captured image on the user electronic device 150 itself. The extracted VIN and associated vehicle information returned by the VIN capture system 110 may be presented in the summary window 205 for the user to review and confirm. The request security recall information button may be selected by the user 101 to submit an information request to the recall identification system 120, which may in turn generate and submit a safety recall query to the safety information system 130, or may cause the safety recall advisory tool to generate and submit a query to the safety information system 130 itself.

In a second view 210, the safety recall advisory tool may present a safety recall report 211 to the user 101. The safety recall report 211 may identify one or more safety recall campaigns associated with a vehicle 212, provide a description of the safety recall 215, indicate a status of the safety recall 214 (i.e., whether or not it has been repaired), and include an appointment scheduling button 213. The user 101 may be able to select the appointment scheduling button 213 to initiate a connection with an authorized service center system 140, either directly or indirectly through the recall identification system 120, and schedule a vehicle service appointment in the manner described above.

Figure 3:
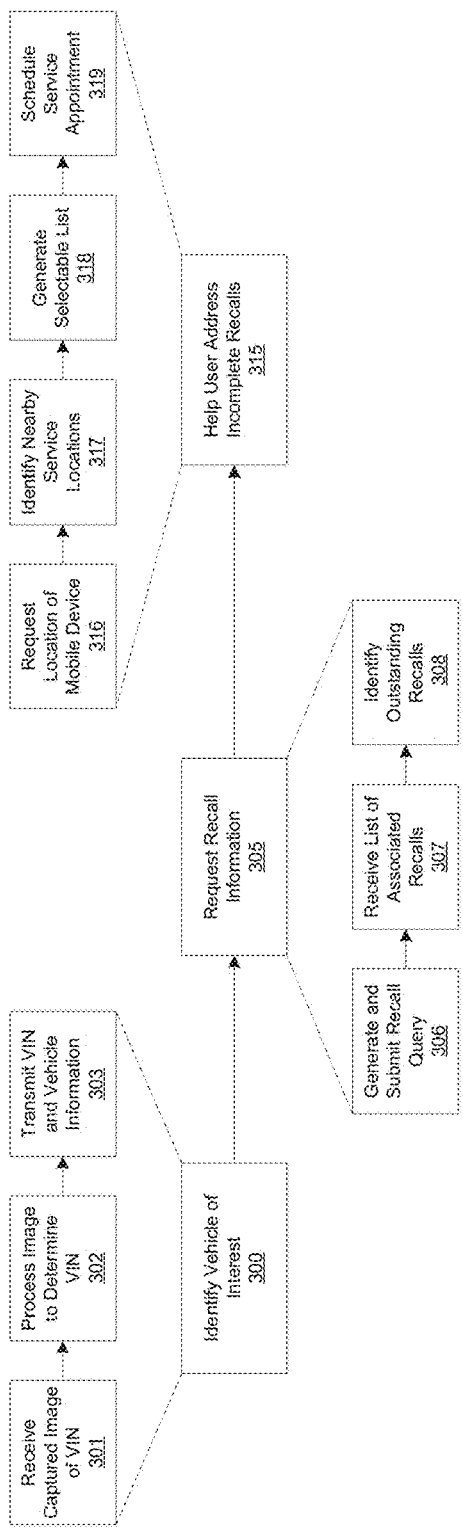
FIG. 3 provides a logical flow for the operation of the recall identification system.

FIG. 3 illustrates a logical flow of one manner of operation of the user electronic device 150 and recall identification system 120. A user 101 may use the safety recall advisory tool to identify a vehicle of interest for which safety recall information is desired (300). For example, the user 101 may use the digital camera 152 of the user electronic device 150 to capture an image of a vehicle 103 that contains a VIN (301). The user may transmit the captured image to a VIN capture system 110 for processing and decoding (302). The VIN capture system 110 may extract a VIN present in the image and decode the VIN to determine vehicle information associated with the VIN, including, for example, a model, make (manufacturer), model year, or the like. The VIN capture system 110 may return the extracted VIN and associated vehicle information to the user electronic device 150 (303). In embodiments, where the functionality of the VIN capture system 110 is provided within the user electronic device 150, the user electronic device 150 may extract a VIN from the captured image and decode the VIN to determine the aforementioned vehicle information associated with the VIN.

The user electronic device 150 may then transmit an information request to the recall identification system including the determined VIN and/or associated vehicle information, requesting information regarding any safety recalls associated with the vehicle 103 (305). The recall identification system 120 may generate a recall query in response to the information request, and may submit the query to a safety information system 130 (306). The safety information system 130 may respond to the query by providing a list of safety recall campaigns issued for the vehicle, along with descriptive information regarding the recall, to the recall identification system 120 (307). The recall identification system 120 may identify any safety recalls that have not been repaired and generate a report, which may be sent to the user electronic device 150 (308). As noted above, in some embodiments, the user electronic device 150 may generate and submit the recall query itself, and may also process the received response to generate a safety recall report.

The safety recall advisory tool may present the report to the user 101, and assist the user with addressing the incomplete recalls (315). In doing so, the safety recall advisory tool may determine the location of the user electronic device 150 (316) and compare the determined location against known locations of authorized service centers to identify and generate a list of nearby service locations (317). In some embodiments, the safety recall advisory tool may transmit the location of the user electronic device 150 to the recall identification system 120, which may perform the location comparison and return a list of nearby authorized service center locations. The safety recall advisory tool may generate appointment-scheduling links for each authorized service location on the list (318). In response to a user selection of a particular link, the safety recall advisory tool may establish a connection with the associated authorized service center system 140 and schedule a vehicle service appointment (319).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A system comprising:
a memory; and
a processor in communication with the memory, the processor configured to:
receive an image of a vehicle from a remote user device, the image comprising a vehicle identification number (VIN);
extract the VIN from the image of the vehicle and decode the VIN to determine corresponding vehicle information;
transmit the extracted VIN and corresponding vehicle information to the remote user device;
generate a recall query, in response to a recall request received from the remote user device, requesting safety recall information associated with the vehicle, and submitting the query to a remote information system;
in response to a response to the query that is received from the remote information system:
determine a recall associated with the vehicle;
determine a repair status of the vehicle relative to the recall;
generate a recall history including the repair status of the vehicle based on the determination of the repair status of relative to the recall; and
transmit the recall history report to the remote user device for presentation to a user.

2. The system of claim 1, wherein the response to the query comprises a list of one or more recall campaigns associated with the vehicle, a recall campaign number, a list of effected components, or a descriptive summary for each recall campaign on the list.

3. The system of claim 2, wherein the processor is further configured to:
determine, for each recall campaign on the list of one or more recall campaigns associated with the vehicle, whether the vehicle has been repaired; and
indicate a repair status of the vehicle in the recall history based on the determination.

4. The system of claim 3, wherein the processor is further configured to:
receive, from the remote user device, a user selection of a recall campaign identified in the recall history for which a service appointment is desired, and in response to the user selection of the recall campaign automatically:
determine a physical location of the remote user device;
identify service centers that are within a certain distance of the physical location of the remote user device; and
transmit a list of identified service centers to the remote user device for presentation to the user;

receive, from the remote user device, a user selection of a particular service center from the list of identified service centers, and in response to the user selection of the particular service center automatically:
  identify a service center system associated with the particular service center that was selected;
  submit a service appointment availability request to the associated service center system; and
  transmit a list of available service appointments to the remote user device for presentation to the user, the list of available service appointments being generated based on service appointment scheduling information received from the associated service center system in response to the service appointment availability request and comprising selectable links for scheduling each of the available service appointments; and
receive, from the remote user device, a user selection of a particular selectable link from the list of available service appointments, and in response to the user selection of the particular selectable link automatically:
  schedule a particular service appointment corresponding to the link with the particular service center using the associated service center system; and
  transmit an appointment scheduling confirmation message to the remote user device for presentation to the user.

5. The system of claim 3, wherein the processor is configured to:
for each recall campaign identified in the recall history in need of repair, automatically:
  determine a physical location of the remote user device;
  identify service centers that are within a certain distance of the physical location of the remote user device;
  identify one or more service center systems associated with each of the identified service centers;
  submit one or more service appointment availability requests to the one or more service center systems; and
  transmit a list of available service appointments to the remote user device for presentation to the user, the list of available service appointments being generated based on service appointment scheduling information received from the one or more service center systems in response to the one or more service appointment availability requests and comprising selectable links for scheduling each of the available service appointments; and
receive, from the remote user device, a user selection of a particular selectable link from the list of available service appointments, and in response to the user selection of the particular selectable link automatically:
  schedule a particular service appointment corresponding to the link with a particular service center using a particular associated service center system; and
  transmit an appointment scheduling confirmation message to the remote user device for presentation to the user.

6. The system of claim 3, wherein the processor is configured to:
for each recall campaign identified in the recall history in need of repair, automatically:
  determine a physical location of the remote user device;
  identify service centers that are within a certain distance of the physical location of the remote user device;
  identify one or more service center systems associated with each of the identified service centers;
  submit one or more service appointment availability requests to the one or more service center systems;
  select a particular service appointment from a list of available service appointments generated based on service appointment scheduling information received from the one or more service center systems in response to the one or more service appointment availability requests;
  schedule the particular service appointment with a particular service center using a particular associated service center system; and
  transmit an appointment scheduling confirmation message to the remote user device for presentation to the user.

7. The system of claim 6, wherein the processor is further configured to:
  receive, from the remote user device, an appointment cancellation request responsive to the appointment scheduling confirmation; and
  cancel the particular service appointment with the particular service center using the particular associated service center system.

8. The system of claim 6, wherein the processor is configured to automatically select an earliest service appointment based on a comparison of a current time to the service appointment scheduling information received from the one or more service center systems.

9. The system of claim 6, wherein the processor is configured to automatically select a most convenient service appointment based on a comparison of a user calendar to the service appointment scheduling information received from the one or more service center systems.

10. The system of claim 6, wherein the processor is configured to automatically select the particular service appointment based on a determination that the user has visited the particular service center on a prior service appointment.

11. A system comprising:
an interactive display;
a memory; and
a processor in communication with the memory, the processor configured to:
  capture an image of a vehicle comprising a vehicle identification number (VIN);
  extract the VIN from the image of the vehicle and decode the VIN to determine corresponding vehicle information;
  generate a recall query using the extracted VIN and corresponding vehicle information and submit the query to a remote information system;
  in response to a response to the query that is received from the remote information system:
    determine a recall associated with the vehicle;
    determine a repair status of the vehicle relative to the recall; and
    generate a recall history including the repair status of the vehicle based on the determination of the repair status of the vehicle relative to the recall; and
  present the recall history to a user via the interactive display.

12. The system of claim 11, wherein the response to the query comprises a list of one or more recall campaigns associated with the vehicle, a recall campaign number, a list of effected components, or a descriptive summary for each recall campaign on the list.

13. The system of claim 12, wherein the processor is further configured to:
   determine, for each recall campaign on the list of one or more recall campaigns associated with the vehicle, whether the vehicle has been repaired; and
   indicate a repair status of the vehicle in the recall history based on the determination.

14. The system of claim 13, wherein the processor is further configured to:
   receive, via the interactive display, a user selection of a recall campaign identified in the recall history for which a service appointment is desired, and in response to the user selection of the recall campaign automatically:
      determine a physical location of the system;
      identify service centers that are within a certain distance of the physical location of the system; and
      present a list of identified service centers to the user via the interactive display;
   receive, via the interactive display, a user selection of a particular service center from the list of identified service centers, and in response to the user selection of the particular service center automatically:
      identify a service center system associated with the particular service center that was selected;
      submit a service appointment availability request to the associated service center system; and
      present a list of available service appointments to the user via the interactive display, the list of available service appointments being generated based on service appointment scheduling information received from the associated service center system in response to the service appointment availability request and comprising selectable links for scheduling each of the available service appointments; and
   receive, via the interactive display, a user selection of a particular selectable link from the list of available service appointments, and in response to the user selection of the particular selectable link automatically:
      schedule a particular service appointment corresponding to the link with the particular service center using the associated service center system; and
      present an appointment scheduling confirmation message to the user via the interactive display.

15. The system of claim 13, wherein the processor is configured to:
   for each recall campaign identified in the recall history that has not been repaired, automatically:
      determine a physical location of the system;
      identify service centers that are within a certain distance of the physical location of the system;
      identify one or more service center systems associated with each of the identified service centers;
      submit one or more service appointment availability requests to the one or more service center systems; and
      present a list of available service appointments to the user via the interactive display, the list of available service appointments being generated based on service appointment scheduling information received from the one or more service center systems in response to the one or more service appointment availability requests and comprising selectable links for scheduling each of the available service appointments; and
   receive, via the interactive display, a user selection of a particular selectable link from the list of available service appointments, and in response to the user selection of the particular selectable link automatically:
      schedule a particular service appointment corresponding to the link with a particular service center using a particular associated service center system; and
      present an appointment scheduling confirmation message to the user via the interactive display.

16. The system of claim 13, wherein the processor is configured to:
   for each recall campaign identified in the recall history in need of repair, automatically:
      determine a physical location of the system;
      identify service centers that are within a certain distance of the physical location of the system;
      identify one or more service center systems associated with each of the identified service centers;
      submit one or more service appointment availability requests to the one or more service center systems;
      select a particular service appointment from a list of available service appointments generated based on service appointment scheduling information received from the one or more service center systems in response to the one or more service appointment availability requests;
      schedule the particular service appointment with a particular service center using a particular associated service center system; and
      present an appointment scheduling confirmation message to the user via the interactive display.

17. The system of claim 16, wherein the processor is further configured to:
   receive, via the interactive display, an appointment cancellation request responsive to the appointment scheduling confirmation; and
   cancel the particular service appointment with the particular service center using the particular associated service center system.

18. The system of claim 16, wherein the processor is configured to automatically select a most convenient service appointment based on a comparison of a user calendar to the service appointment scheduling information received from the one or more service center systems.

19. The system of claim 16, wherein the processor is configured to automatically select the particular service appointment from the list of available service appointments based on a determination that the user has visited the particular service center on a prior service appointment.

20. A system comprising:
   a memory; and
   a processor in communication with the memory, the processor configured to:
      receive an image of a vehicle from a remote user device, the image comprising a vehicle identification number (VIN);
      extract the VIN from the image of the vehicle and decode the VIN to determine corresponding vehicle information;
      transmit the extracted VIN and corresponding vehicle information to the remote user device;
      generate a recall query, in response to a recall request received from the remote user device, requesting safety recall information associated with the vehicle, and submitting the recall query to a remote information system;

in response to a response to the query that is received from the remote information system generate a recall history including a recall repair history for the vehicle; and transmit the recall history to the remote user device for presentation to a user; and wherein the processor is further configured to:

receive, via an interactive display, a user selection of a recall campaign identified in the recall history for which a service appointment is desired, and in response to the user selection of the recall campaign automatically:

determine a physical location of the system;

identify service centers that are within a certain distance of the physical location of the system; and present a list of identified service centers to the user via the interactive display;

receive, via the interactive display, a user selection of a particular service center from the list of identified service centers, and in response to the user selection of the particular service center automatically:

identify a service center system associated with the particular service center that was selected;

schedule a particular service appointment with the particular service center via an associated service center system; and present an appointment scheduling confirmation message to the user via the interactive display.

\* \* \* \* \*